United States Patent Office 3,748,262
Patented July 24, 1973

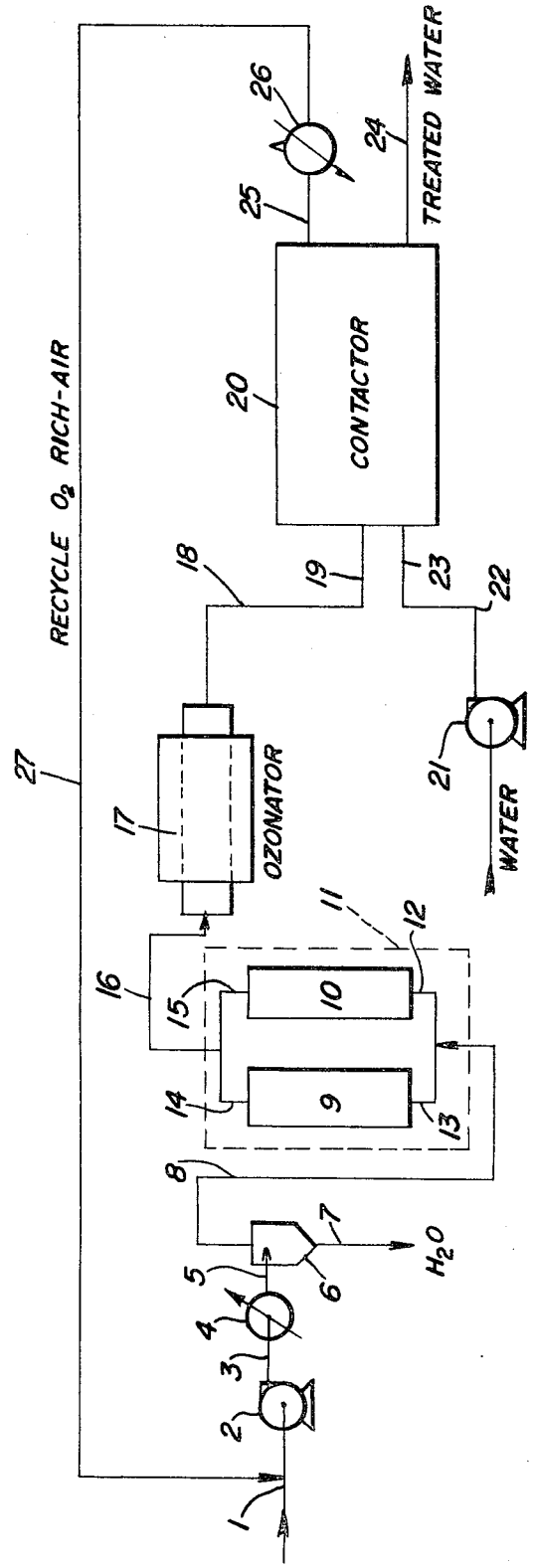

3,748,262
CLOSED-LOOP GENERATING AND CONTACTING SYSTEM
Hanju Lee, Columbia, and Harvey Milton Rosen, Laurel, Md., assignors to W. R. Grace & Co., New York, N.Y.
Filed Dec. 3, 1971, Ser. No. 204,503
Int. Cl. C02b 1/38
U.S. Cl. 210—63                           18 Claims

ABSTRACT OF THE DISCLOSURE

By this system, water can be treated with ozone in a closed loop cycle, thus conserving the high oxygen content gas used for ozone generation. The system comprises as a principal feature a pressure-swing fractionator which removes nitrogen, carbon dioxide and water vapor from a feed gas, producing an oxygen enriched gas which flows to an ozonator. On exit from the ozonator, the oxygen enriched gas contains from about 1 to 7 percent ozone. This gas mixture is then contacted with water to be treated. Purified water is recovered, and excess gas mixture, now at least partially depleted in ozone and oxygen and enriched in nitrogen, forms a recycle gas which is combined with a charge of air and flowed to the pressure-swing fractionator to begin another cycle. The pressure-swing fractionator serves the dual simultaneous purpose of producing the necessary oxygen enriched gas for the ozonator and maintaining a low nitrogen level throughout the closed loop.

---

This invention relates to a closed-loop ozone liquid treating system utilizing a pressure-swing fractionator for generating oxygen and controlling nitrogen levels within the closed loop. More particularly, this invention comprises an apparatus and method for the efficient generation of oxygen enriched air from which ozone is then generated followed by the use of the resulting oxygen enriched air-ozone stream in the treatment of a contaminated liquid media with recycle of any unused oxygen enriched air, along with contaminants to the pressure-swing oxygen generator. This closed-loop, and particularly in combination with a pressure-swing oxygen generating system, has many advantages which will be further set out.

Ozone has many uses as a purifying and disinfecting agent. It has been used for bleaching, disinfecting and clarifying drinking water, dissipating organics in industrial waste streams prior to disposal, and in treatment of municipal waste water to reduce the TOC (total organic carbon) content and COD (chemical oxygen demand). There is no doubt that ozone is a very effective material for use in any of these processes. However, no matter how effective a material it is, it still must compete on a cost basis with other materials and processes. The principal feature of this invention is that it provides a system, particularly useful in waste water treatment, which requires a decreased initial capital cost, as well as decreased operating costs. By decreasing both the initial and long term costs, ozonation now has a competitive advantage over existing techniques. Further description in this application will be directed to waste water treatment, however, it should be borne in mind that the system may be used in combination with essentially any purifying, disinfecting or bleaching operation.

A particular problem in waste water treatment, is the TOC (total organic carbon) and COD (chemical oxygen demand) of the treatment plant effluent stream. The COD of this stream should be as low as possible. Ozone effectively lowers the COD and TOC content of effluents from waste water treatment plants. It removes odors and color from water and destroys pathogenic organisms. Residual ozone decomposes rather rapidly since it has a half life of about 20 minutes in water. Tertiary treatment with ozone has the potential decreasing waste water treatment time while considerably decreasing the COD and TOC content.

The published prior art in regard to the present process is best evidenced in technical publications of the U.S. Department of Interior and various literature articles. Report No. TWRC-4 (PB187758), Ozone Treatment of Secondary Effluents From Wastewater Treatment Plants, is illustrative of an available Department of Interior Report. Illustrative of a literature article is the paper, "Practical Aspects of Water and Waste Water Treatment by Ozone" by E. W. J. Diaper, which was presented at the 162nd National Meeting of the American Chemical Society in Washington, D.C. Other available prior art known to the inventors consists of studies conducted at the Blue Plains Wastewater Treatment Plant in Washington, D.C. These studies have consisted of closed-loop oxygen-ozone treatment of wastewater, but using a liquid or compressed oxygen as the initial oxygen source. The present system is a distinct improvement over such prior art systems, and particularly by integrating a pressure-swing oxygen generator into the closed loop.

The pressure-swing oxygen generator provides two principal and distinct advantages when introduced into a closed loop system. Firstly, it provides an efficient method of removing some or all of the nitrogen from air so as to provide an oxygen enriched air stream with an oxygen content of from 30 percent to 95 percent oxygen. The air component which generally is not removed in pressure-swing air fractionation is argon, which is present in about a 4 percent to 5 percent content in a 95 percent oxygen stream. This pressure-swing technique provides a continuous on site generation of oxygen as needed, using ambient air as the source material. This eliminates the need for cryogenic storage tanks and having to depend on shipments. The per pound cost of oxygen is also less than when a compressed or cryogenic oxygen source is used.

The second, and probably the most significant advantage in using a pressure-swing oxygen generator integrated into the system, is that recycle oxygen enriched air will contain increased nitrogen from having been in contact with the waste water. Waste water will contain dissolved nitrogen due to the partial pressure of nitrogen in the atmosphere as well as due to formation from waste decomposition. In a closed loop system, this nitrogen will tend to build up to an equilibrium level which would be about that of the atmosphere exterior to the closed-loop. In order to avoid this nitrogen level build-up in a closed-loop, systems using compressed or cryogenic oxygen as the oxygen source require that all the waste water prior to ozone treatment undergo an elaborate deaeration technique. This requires a large deaeration chamber, high capacity vacuum pump and a waste water pump not required when a pressure-swing oxygen generator is used. The pressure-swing oxygen generator in the present system serves the dual concurrent function of yielding a system which is less complex in equipment and operation, and less costly in regard to initial capital outlay and operation. It produces the required oxygen while simultaneously maintaining nitrogen at a low level. In this invention, no deaeration step or equipment is required.

It is, therefore, a prime object of this invention to set out a closed-loop system for generating ozone from an integral oxygen producing source, treat a fluid media with the ozone containing gas, and recycle excess gas to the oxygen producing source for reuse.

It is also a significant object of this invention to provide a closed-loop ozone water treatment system wherein a pressure-swing oxygen generator serves the concurrent dual function of producing an oxygen enriched gas feed for an ozone generator, and serves also to remove nitrogen in the closed-loop system.

It is additionally an object of this invention to set out a closed-loop waste water treatment system wherein oxygen or oxygen enriched air for feeding to an ozone generator is produced on-site, and yet the system requires less capital outlay as well as yielding lower operating costs while further yielding a more efficient system.

In brief summary, this invention comprises a closed-loop oxygen generation and ozone water treatment system, and particularly a system useful in waste water treatment. The system has a pressure-swing oxygen generator as an integral part of the closed-loop. The pressure-swing oxygen generator fractionates air and recycle gas, removing nitrogen which is vented to the atmosphere, providing an oxygen enriched gas of up to 95 percent oxygen for feeding to an ozonator. The pressure-swing oxygen generator thereby automatically controls the amount of nitrogen within the system. The effluent ozone containing stream from the ozonator is flowed to a contactor where there is intimate contact between the ozone containing stream and the water or waste water. Excess gas from the contactor, which now contains an increased nitrogen content, is flowed on recycle via a dryer to the pressure-swing oxygen generator along with fresh air. The pressure-swing oxygen generator fractionates this combined feed removing nitrogen. This oxygen enriched gas is then flowed to the ozonator and the cycle repeated.

The figure is a schematic diagram of the closed-loop ozone treatment system.

In this specification, the effluent from the pressure-swing oxygen generator will be termed oxygen enriched gas. This term is equivalent to oxygen enriched air.

The figure illustrates a preferred system layout of the concept of the present invention. The feature of prime significance is the incorporation of a pressure-swing oxygen generator into the system at a point prior to the ozonator, but subsequent to the combining of recycle oxygen enriched gas and air. In more detail, fresh air and recycle oxygen rich gas mix in pipe 1. This comixture is pulled through compressor 2 which increases the pressure of this gas to about 25 p.s.i. to 150 p.s.i. This gas comixture then passes via pipe 3 to chiller 4. Condensed water and the gas comixture pass via pipe 5 to separator 6 where the water is removed at pipe 7. The comixture gas, which is now at an increased pressure and fairly dry, passes by pipe 8 to the pressure-swing oxygen generator 11. The pressure-swing oxygen generator, enclosed in the dash outline in the figure, consists of at least two adsorbent beds designated here 9 and 10. Piping 12 or 13 delivers the feed gas comixture to the proper adsorbent bed. Two beds are set out here strictly for purposes of simplicity. A three adsorbent bed device is very useful with a four or more adsorbent bed device having certain advantages.

The theory of pressure-swing fractionation as it is also designated, is that adsorbents have a greater selectivity for at least one component of a mixture. For gaseous fractionation, crystalline aluminosilicate zeolites are used as the adsorbent. These zeolites selectively adsorb nitrogen from an air stream allowing oxygent to pass through the adsorbent bed. By the use of two or more adsorbent beds, at least one bed can be on an oxygen producing phase while one or more beds are being regenerated, that is, depleted of adsorbed nitrogen. On completion of the regeneration phase, the adsorbent bed is then switched to the adsorbing phase of selectively adsorbing nitrogen and producing an oxygen enriched stream. Thereafter, by a selective switching "swinging" of the adsorbent beds from an adsorption phase to a regeneration phase and so on a continuous oxygen enriched stream can be produced. Nitrogen removed from the adsorbent bed on regeneration can be passed into the atmosphere. U.S. patents which illustrate the state-of-the-art of pressure-swing fractionation, and which are considered to be very useful in the present system are 3,564,816, 3,237,377, 3,086,339, 3,102,013, 3,104,162, 3,138,439, 3,252,268, 3,142,547 and 2,944,627.

An oxygen enriched gas exits the pressure-swing fractionator at pipe 16. This gas will have a composition of from about 30 percent to 95 percent oxygen with the remainder being argon and residual components of air. As an example, when this gas is 95 percent oxygen the residual component will be argon. However, when the enriched gas is from 40 percent to 80 percent oxygen, there will be significant amounts of argon and nitrogen present, as well as minor amounts of other gases. Preferably, the oxygen enriched gas will contain about 60 to 90 percent oxygen. The pressure-swing zeolitic adsorbent will remove any water vapor from the input gas.

From pipe 16, this oxygen enriched gas passes into ozonator 17. This may be an ozonator utilizing tubular electrodes or one utilizing flat electrodes. Each operates on the same principal. The oxygen enriched gas is passed between pairs of high potential electrodes and low potential electrodes which are shielded with a delectric. The electrode gap is usually about 1 to 3 millimeters. The glow discharge which is maintained in this gap produces the ozone. Depending on the oxygen content of the enriched gas, the ozone content will range from about 1 percent to 7 percent by weight. Useful ozone generators are produced by The Welsbach Corporation, Philadelphia, Pa. and the Ozonator Corporation, Batavia, N.Y. Preferred ozone generators are those of an improved design disclosed in Italian Pat. 869,360, issued July 15, 1970. These improved ozone generators have a lower operating cost.

The oxygen enriched gas containing ozone then flows via pipes 18 and 19 to contactor chamber 20. Water to be treated is pumped by pump 21 through pipes 22 and 19 and into contactor chamber 20. The exact contactor construction may vary. This may be a countercurrent or co-current single or multiple column continuous type contactor, or it may be a high shear or low shear batch type contactor. Further, there may be a combination of these techniques. This is not a critical feature of this invention, and actually any effective type of gas-liquid contacting system can be used. In most instances, other plant requirements will destate the type of contactor used.

Purified water exits the contactor chamber at pipe 24. A recycle gas composed of oxygen enriched gas which now contains an increased nitrogen level due to use of oxygen and transfer of dissolved nitrogen from the treated water, exits the contactor chamber at pipe 25. This gas may optionally pass through a heater 26 to decompose any residual ozone. Thereafter, the recycle gas flows by pipe 27 to pipe 1 for comixture with air in pipe 1 and a repeat of the cycle. This closed-loop can be continuously repeated since the pressure-swing fractionator continuously determines the nitrogen gas level in the system. This nitrogen level in the closed-loop system can be maintained constant, regardless of the dissolved nitrogen content of the water which undergoes treatment. In essence, this nitrogen level adjustment is an automatic and inherent feature of this system. Depending on the adjustment of the pressure-swing oxygen generator, the amount of nitrogen removed can range from about 10 percent to essentially complete removal.

In more detail concerning this pressure-swing oxygen generator, preferred devices are set out in U.S. Pats. 3,086,339 and 3,142,547. These patents set out improvements on the device of U.S. Pat. 2,944,627. The basic pressure-swing systems consist of essentially two phases. The adsorption phase and the regeneration phase. The adsorption phase can be optimized by maintaining the bed temperature at about ambient or below, and allowing the column to approach the breakthrough point prior to swinging. The breakthrough point is that point where the adsorbent is at full capacity. These are the principal operational techniques for optimizing the adsorption phase. However, there are many techniques that can be utilized to optimize the regeneration phase. Regeneration is the removal of the adsorbed component from the adsorbent bed. Steps which are conducted during regeneration are a depressurization of the adsorbent bed to ambient pressure or below and the flowing of a purge gas through the adsorbent bed. Optionally, the bed may also be heated. U.S. Pat. 2,944,627 discloses the feature of using a portion of product gas from the bed on the adsorbing phase as the purge gas for the adsorbent bed on regeneration. This product gas may flow directly from the adsorbent bed on the adsorbing phase or from a purge tank. In U.S. Pat. 3,142,547 there is disclosed a method of using depressurizing gas as an effective backwash or purge gas. Depressurizing gas will have a higher oxygen content than input gas and as such will be a good purge media. By the use of the depressurizing gas along with product gas as the purge gas, the pressure-swing system is made more economical. U.S. Pat. 3,086,339 discloses a three adsorbent bed system utilizing a depressurization gas and a product gas purge. Such a system will produce oxygen enriched gas in a fairly high volume.

The adsorbent used in the adsorbent beds of these pressure-swing devices is usually a synthetic zeolite such as Zeolite A, X or Y enchanged with potassium, alkali earth ions, rare earth ions, transition metal ions or mixtures of these ions; or a naturally occurring zeolite such as erionite, mordenite, chabazite, gmelinite, heulandite or faujasite in its natural or metal ion exchanged form. Very useful adsorbents are alkaline earth exchange Zeolite A and Zeolite X, and particularly these zeolites exchanged with barium and strontium ions.

In actual system operation, input air and recycle gas are comixed and compressed to a pressure of about 25 p.s.i. to 50 p.s.i. This compressed gas passes through the condenser where water vapor is removed as liquid water, and thereafter to the pressure-swing fractionator. The ratio of air to recycle gas in this comixture will depend on the amount of oxygen needed to replace that which has been converted to ozone, and that used in the contacting step. In general, air will have to be added in a ratio of about 5 to 10 times the amount of oxygen that is required to replace that used in the previous cycle. Since air is only about 20 percent oxygen, at least 5 volumes of air must be added for each volume of oxygen required. Higher volumes of air are usually added since some of the oxygen enriched product gas from the pressure-swing fractionator is used as a purge gas within the fractionator. The dried air-recycle gas comixture then passes through the pressure-swing fractionator where nitrogen is decreased in concentration or fully removed. At this stage, essentially all carbon dioxide and water vapor are removed. The resulting oxygen enriched gas, now containing about 60 to 90 percent oxygen, is fed to the ozonator. The ozonator effluent contains 3 to 6 percent ozone, with the oxygen content being decreased 4.5 to 9 percent. This gas flows to the contactor where it is thoroughly contacted with water. Continuous co-current contacting of the water and oxygen enriched gas containing ozone provides maximum contact and use of ozone. During this contacting, dissolved nitrogen leaves the water phase, with ozone and some oxygen being dissipated in the water phase. The resulting nitrogen enriched gas forms the recycle gas which is combined with air for initiation of another cycle.

As is evident, this system could be used for any liquid treatment. However, it is most useful in water purification treatment. This can consist of producing potable water, or the treatment of industrial or municipal waste streams. In the treatment of municipal waste streams, this system can be used in combination with secondary or tertiary treatment, or both. Further uses will be obvious to those in the art as situations develop.

What is claimed is:

1. A closed-loop water treatment process using ozone comprising:
   (a) flowing an oxygen enriched gas to an ozonator wherein from about 1 to 7 percent ozone is formed; said oxygen enriched gas being the product of a pressure-swing fractionator;
   (b) flowing the oxygen enriched gas containing ozone to a gas liquid contactor;
   (c) flowing water to be treated with said oxygen enriched gas containing ozone to said contactor;
   (d) thoroughly contacting said water and said oxygen enriched gas containing ozone and collecting a treated water which is substantially purified;
   (e) flowing excess oxygen enriched gas depleted at least partially of ozone and oxygen from said contactor as a recycle gas and comixing said recycle gas with a portion of air;
   (f) flowing the comixture of air and recycle gas through a pressure-swing fractionator wherein nitrogen is selectively removed, thereby yielding an oxygen enriched gas; and
   (g) repeating step (a), thereby producing a closed-loop water treatment system.

2. The process of claim 1 wherein during contacting dissolved nitrogen from the water being treated comixes with the oxygen enriched gas containing ozone increasing the nitrogen content of said oxygen enriched gas containing ozone, which subsequently constitutes said recycle gas.

3. A process as in claim 2 wherein nitrogen is removed from said recycle gas and said air after comixing said recycle gas and air by passage through said pressure-swing fractionator thereby simultaneously controlling the nitrogen level in the closed-loop while producing an oxygen enriched gas for flowing to said ozonator.

4. A process as in claim 3 wherein during said pressure-swing, fractionation removes residual amounts of carbon dioxide and water vapor, together with nitrogen.

5. A process as in claim 4 wherein the oxygen enriched gas from said pressure-swing fractionator contains from about 30 to 95 percent oxygen.

6. A process as in claim 4 wherein subsequent to comixing said recycle gas and said air the pressure of the comixture is increased to the range of about 25 p.s.i. to 150 p.s.i. with water vapor being removed from the increased pressure stream.

7. A process as in claim 6 wherein said water vapor is removed by condensation to a liquid.

8. A process as in claim 5 wherein said pressure-swing fractionator consists of at least two adsorbent beds whereby an oxygen enriched gas is continuously produced.

9. A process as in claim 8 wherein said pressure-swing fractionator consists of two adsorbent beds, each adsorbent bed containing a crystalline aluminosilicate zeolite adsorbent.

10. A process as in claim 8 wherein said pressure-swing fractionator consists of three adsorbent beds, each adsorbent bed containing a crystalline aluminosilicate zeolite adsorbent.

11. A closed-loop apparatus for the ozone treatment of water comprising:
   (a) a pressure-swing fractionator capable of removing nitrogen from an input comixture gas stream containing at least oxygen and nitrogen, thereby producing an oxygen enriched gas;
   (b) an ozonator;
   (c) conduit means for flowing said oxygen enriched gas to said ozonator;
   (d) a contactor containing gas-liquid contacting means;
   (e) conduit means for flowing an oxygen enriched gas containing ozone from said ozonator to said contactor;
   (f) conduit means for flowing water to said contactor from an inlet;

(g) conduit means for removing treated water from said contactor;

(h) conduit means for removing from said contactor a gas at least partially depleted in ozone and oxygen as a recycle gas; and (i) means for adding air to said recycle gas and conducting the comixture of recycle gas and air to said pressure-swing fractionator.

12. An apparatus as in claim 11 wherein said pressure-swing fractionator contains at least two adsorbent beds, each adsorbent bed containing a zeolite adsorbent.

13. An apparatus as in claim 12 wherein the oxygen enriched gas stream contains from about 30 to 95 percent oxygen.

14. An apparatus as in claim 12 wherein said pressure-swing fractionator contains at least three adsorbent beds; each adsorbent bed containing a zeolite adsorbent.

15. An apparatus as in claim 11 wherein the effluent from said ozonator contains from about 1 to 7 percent ozone.

16. An apparatus as in claim 11 wherein the means for conducting said comixture of recycle gas and air to said pressure-swing fractionator is a compressor which increases the pressure of said comixture.

17. An apparatus as in claim 16 wherein a water vapor removing device is in line between said compressor and said pressure-swing fractionator.

18. An apparatus as in claim 16 wherein said water vapor removing device is a condenser.

References Cited
UNITED STATES PATENTS

| | | | |
|---|---|---|---|
| 511,330 | 12/1893 | Fahrig | 210—192 X |
| 782,021 | 2/1905 | Friberg | 210—63 |
| 996,560 | 6/1911 | Bradley | 210—192 |
| 3,086,339 | 4/1963 | Skarstrom et al. | 55—26 |
| 3,660,277 | 5/1972 | McWhirter et al. | 210—195 X |
| 3,685,656 | 8/1972 | Schaefer | 210—195 |

SAMIH N. ZAHARNA, Primary Examiner

T. G. WYSE, Assistant Examiner

U.S. Cl. X.R.

210—192, 194, 218